Feb. 21, 1939.　　　B. M. CARTER　　　2,148,258
PRODUCTION OF SULPHUR
Filed Nov. 12, 1934
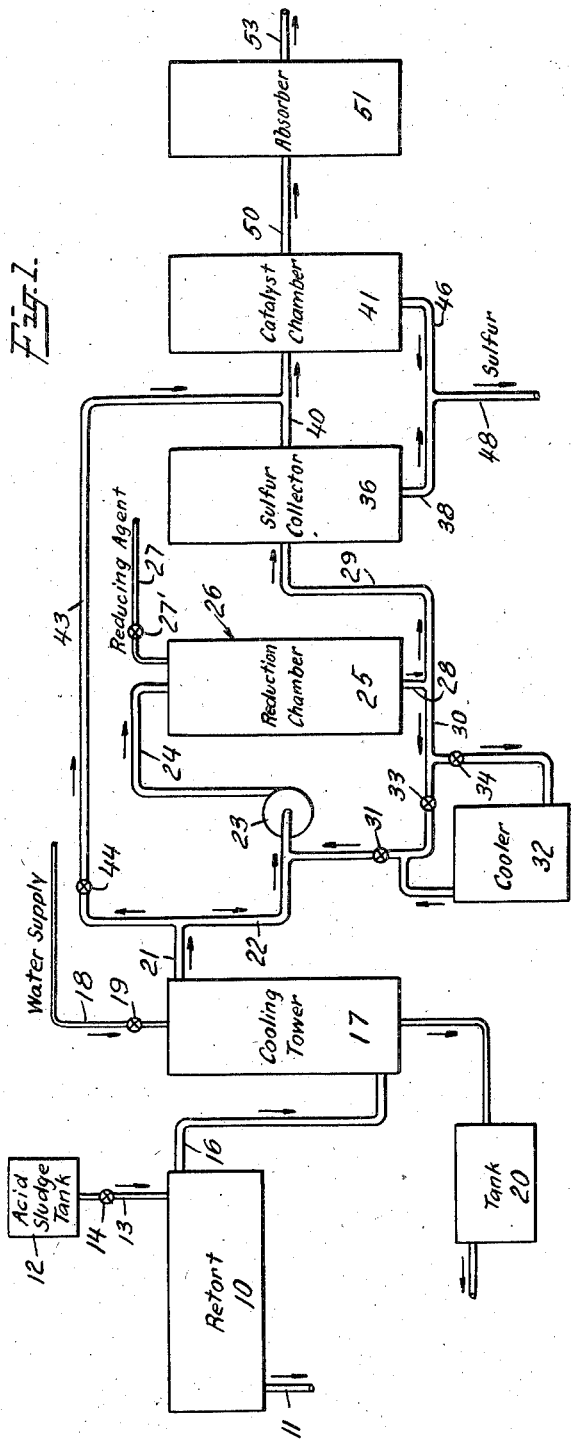
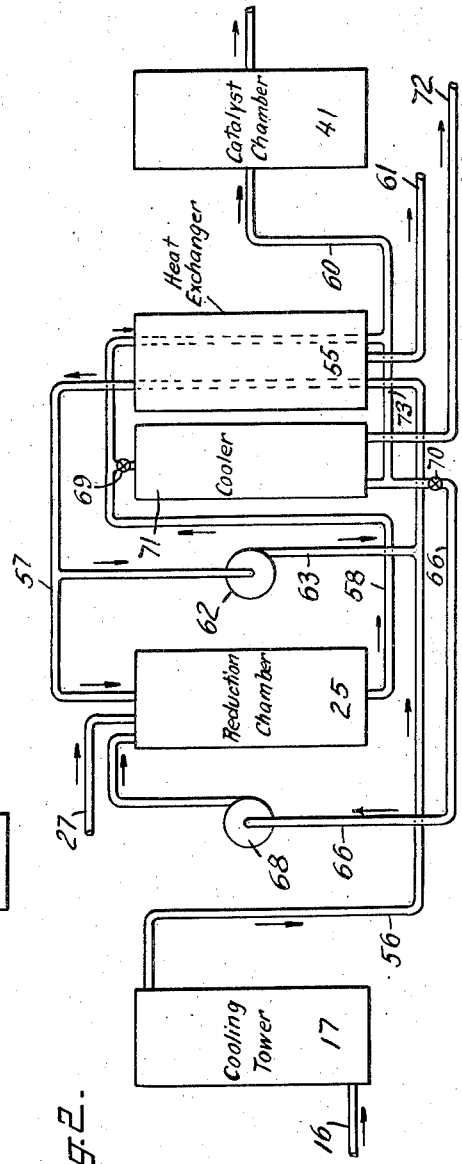
INVENTOR
Bernard M. Carter
BY
ATTORNEY Patented Feb. 21, 1939

2,148,258

UNITED STATES PATENT OFFICE 2,148,258

PRODUCTION OF SULPHUR

Bernard M. Carter, Montclair, N. J., assignor to General Chemical Company, New York, N. Y., a corporation of New York Application November 12, 1934, Serial No. 752,555

4 Claims. (Cl. 23—226)

This invention relates to the production of elemental sulphur, and more particularly the invention is directed to methods for the production of elemental sulphur from sulphur dioxide gas mixtures formed by the decomposition of sulphuric acid sludges constituting waste products of numerous oil refining processes. This application contains subject matter in common with my copending application Serial No. 606,757, filed April 21, 1932, now U. S. Patent 2,080,384 of May 11, 1937.

Several processes have been suggested for the recovery, from acid sludges, of sulphur as sulphur dioxide. In general, prior operations involve decomposition of acid sludges by heating, with the production of gas mixtures containing sulphur dioxide, and accompanying formation of solid carbonaceous residue of varying composition. It has been proposed to utilize the sulphur dioxide thus recovered in the manufacture of sulphuric acid by the contact process by bringing about catalytic oxidation of sulphur dioxide to sulphur trioxide. Processes for the production of elemental sulphur from sulphur dioxide gas mixtures, by reacting the sulphur dioxide at elevated temperatures with carbonaceous reducing agents, have also been suggested. Prior methods, however, have been such as to require the consumption of relatively large amounts of fuel for the purpose of maintaining the high temperatures required in the reducing reaction.

The principal object of the present invention contemplates the provision of an economical method for the production of elemental sulphur. Notwithstanding prevailing economic desirability of recovering sulphur values from acid sludges, numerous prior proposals for effecting recovery of sulphur compounds from acid sludges as sulphur dioxide, previous suggestions generally for the production of elemental sulphur by reduction of sulphur dioxide, and also known difficulties encountered in the production of elemental sulphur from sulphur dioxide gas mixtures, such difficulties arising chiefly from low sulphur dioxide concentrations and relatively high oxygen content, resulting in high fuel consumption, it has not heretofore been recognized that acid sludges constitute most desirable sources of sulphur dioxide for reduction to produce elemental sulphur. I have discovered that elemental sulphur may be most economically and advantageously produced from acid sludges. As stated, in prior processes for the production of elemental sulphur by reduction of sulphur dioxide gases by reducing agents, difficulties in providing methods of commercial nature have been caused largely by the low sulphur dioxide concentration of the sulphur dioxide gas mixtures which also generally contain appreciable amounts of free and combined oxygen, the low sulphur dioxide concentrations and oxygen content requiring the use of relatively large amounts of fuel, and elaborate apparatus to accommodate the immense volumes of gas handled per unit of sulphur recovery. In none of the prior methods, of which I am aware, has it been possible to produce elemental sulphur in operations involving self-sustaining reduction reactions, that is a reaction in which substantially no heat is supplied or formed other than that generated in the reaction of the sulphur dioxide with the reducing agent. According to the present improvements, such prior difficulties are largely overcome, and the invention presents a method by which elemental sulphur may be cheaply produced from waste products by a method comprising a self-sustaining reduction operation.

I have found that the decomposition of acid sludge may be effected so as to provide a gas mixture having a relatively high sulphur dioxide content and containing little or no free oxygen, and by carrying out such procedure in conjunction with the reduction of the relatively concentrated sulphur dioxide so produced, a commercially feasible method for producing elemental sulphur at costs lower than heretofore is afforded.

Generally stated, the invention comprises the decomposition of acid sludge to produce a gas mixture relatively rich in sulphur dioxide and containing preferably substantially no free oxygen, and then reducing the sulphur dioxide to elemental sulphur. In order that the reduction operation will be self-sustaining from the standpoint of heat balance, in accordance with this invention a gas having a sulphur dioxide concentration of at least about 9% by volume is produced and utilized for reduction and this gas is prepared to contain little or no free oxygen. By operating with gas of at least about 9% sulphur dioxide concentration the reduction of the sulphur dioxide to elemental sulphur becomes a self-sustaining reaction, i. e. no extraneous heat need be supplied to effect the reaction when such gas heated to reactive temperature is reacted with reducing material and by utilizing a gas substantially free of oxygen the efficiency of the process from the standpoint of fuel consumption is made to approach the maximum.

One preferred embodiment of the process of the invention comprises the decomposition by external heating of acid sludge, substantially in the absence of air or other diluting gas, to produce a gas mixture containing a relatively large volume of water vapor, a lesser quantity of sulphur dioxide, relatively small amounts of carbon dioxide, carbon monoxide, hydrocarbon vapors and nitrogen, together with solid carbonaceous residues containing little or no undecomposed sulphuric acid. The gas mixture thus produced is cooled to around normal temperatures to condense and remove from the gas stream the bulk of the water vapor and condensable hydrocarbons. Because of the absence of air or other diluting gases, the condensing operation increases the sulphur dioxide concentration of the exit gas stream of the cooler to values generally above about 43% and even as high as 85–95% by volume. The sulphur dioxide of the gas stream is then reduced to elemental sulphur by reacting the sulphur dioxide and reducing agents with or without the aid of catalysts.

The reduction reaction is initiated at temperatures of about 900° F., hence the cool gas stream is heated to this extent prior to introduction into the reduction zone. In the preferred embodiment of the invention, employing gases cooled to about atmospheric temperature and high in sulphur dioxide, say preferably not less than about 43% by volume, it has been found advantageous to preheat the gas stream entering the reduction chamber to about 850° F., by admixing with the cool raw gas, hot reduction products from the reduction zone. This admixture of reduction products with the incoming gas stream heats the latter to reactive temperatures and yet by employing a gas having an initial sulphur dioxide concentration of at least about 43% the preheated gas formed by admixture of the strong cooled sulphur dioxide with the necessary amount of hot reduction products will still have a sulphur dioxide concentration of at least about 13% and the reducing reaction will be self-sustaining. The sulphur produced in the reduction reaction is separated from the exit gas mixture of the reduction zone, and constitutes the product of the process.

A further preferred embodiment of the process of the invention deals with exit gases from the cooler having sulphur dioxide concentrations of less than about 43%, for example gases produced by decomposition of acid sludges by direct contact with hot combustion gases. When operating with such gas mixture, the latter are preferably heated from the temperatures of discharge from the cooler—(ranging from about atmospheric temperature to about 100° F.)—to about 850° F., by passing the gas stream, prior to introduction into the reduction chamber, in indirect heat exchange relation with the hot reduction products issuing from the reduction zone. It has been found that when operating in this manner, exit gases from the cooler containing not substantially less than about 9% sulphur dioxide by volume may be reduced to produce elemental sulphur without the use of extraneous heat and in a self-sustaining operation.

The details, objects and advantages of the invention will be appreciated from the following description taken in connection with the accompanying drawing showing diagrammatically in Fig. 1 an arrangement of apparatus adaptable for use when operating with gas mixtures of relatively high sulphur dioxide concentrations, and in Fig. 2, modified apparatus for producing elemental sulphur from sulphur dioxide gases of lower concentration.

The apparatus of Fig. 1, and the operation of the embodiment of the process carried out therein will first be described.

Referring to Fig. 1 of the drawing, reference numeral 10 indicates an acid sludge decomposing retort. The particular construction of the retort comprises no part of the invention, although in this embodiment of the process, the acid sludge is preferably decomposed in the absence of air or other diluting gas by external heating. The retort 10, for example, may consist of a fixed drum or chamber extending through a combustion chamber having therein a burner for heating the sludge in the retort to the desired degree. The retort may also include therein a series of rabbles or a screw conveyor by which the coke formed during decomposition of the sludge is continuously discharged from the decomposing chamber and withdrawn from the apparatus through an outlet 11. A rotary kiln may be employed if desired. Acid sludge may be introduced from a storage tank 12 into the decomposing chamber of the retort through a pipe line 13 controlled by valve 14.

One end of a gas line 16 opens into the interior of the acid sludge decomposing chamber and affords means for conducting the gases and vapors generated by decomposition of the acid sludge into the bottom of a cooling tower 17. The latter may be a vertical, cylindrical vessel provided at the top thereof with a spray head arranged to create in the tower a downwardly flowing spray of water or other cooling liquid. Water is introduced into the tower through pipe 18 having therein a control valve 19. Water and condensates run out of the bottom of the tower through an outlet pipe into a separating tank 20. After rising through the tower in countercurrent flow relation with the cooling liquid, cooled gases are discharged from the top of the tower into gas line 21 communicating through pipe 22 with the inlet side of a blower 23, discharging through line 24 into the top of a reduction chamber 25 in a vessel 26. Reducing material, in either gaseous, liquid or solid form, may be introduced into reduction chamber 25 through an inlet 27 controlled by a valve 27'.

The vessel 26 is preferably vertically disposed, cylindrically constructed of refractory material and packed with a checkerwork of bauxite brick. The particular form of the reduction chamber is no part of the invention. For example, the reduction chamber may be constructed to provide for one or more beds of reducing material, with provision to replenish the latter as consumed. As noted, the reduction chamber may be advantageously packed with bauxite brick which at high temperatures acts to promote the reaction, the chamber also being provided with suitable means at inlet 27 to feed solid carbonaceous material into the chamber continuously or intermittently. An outlet may also be provided at the bottom of the reduction chamber for discharging ash or solid residue.

Products of the reducing reaction effected in chamber 25 leave the latter through outlet 28 which opens into pipe lines 29 and 30. Although temperature control of the reducing reaction taking place in chamber 25 may be effected in different ways, it is preferred, in this embodiment of the process, to regulate such temperatures by recycling through the reduction chamber reduction products in quantities sufficient to obtain the desired temperature control. Hence, pipe 30 communicates with the inlet side of blower 23, and the amount of reduction products recycled is controlled by valve 31. As hereinafter noted, under some operating conditions, it may be desirable to by-pass some of the gas mixture in line 30 through a cooler 32, and the amount of gas mixture so by-passed is regulated by valves 33 and 34.

Reduction products discharged from chamber 25 and not recycled by blower 23 flow through line 29 into a condenser or sulphur collector 36 which is preferably a waste heat boiler operated so as to condense the sulphur contained in the gas stream. Molten sulphur runs out of the bottom of the collector through an outlet 38.

Gases along with sulphur vapor uncondensed in collector 36 leave the latter through pipe 40 connected to the inlet of a catalyst chamber 41, constructed preferably so as to cause the gas stream to pass through one or more beds of catalytic material. To provide reacting proportions of reducing and reducible gases in catalyst chamber 41, sulphur dioxide gas may be by-passed from pipe 21 through conduit 43, controlled by valve 44, into connection 40. Since operations are preferably conducted so that elemental sulphur produced in chamber 41 is in liquid condition, provision is made for withdrawing molten sulphur from the catalyst chamber through a pipe 46 which with pipe 38 conducts the liquid sulphur product of the process into common sulphur outlet 48.

The gas outlet in catalyst chamber 41 is connected by conduit 50 with an absorber 51 which functions to separate traces of sulphur and sulphur compounds from the gas stream before discharging the latter into the atmosphere through stack 53.

The following illustrates one method of carrying out the improved process employing the apparatus of Fig. 1.

Sulphuric acid sludges, resulting from the refining of oils, vary widely in composition. One representative sludge was found to have a titratable acidity of about 50.8% expressed as $H_2SO_4$, and yielded on decomposition by destructive distillation about 28% residual coke, and a retort gas which, after cooling to about normal temperatures, produced about 6% condensable oils, about 35% water, the balance of the retort gas comprising sulphur dioxide, carbon dioxide, carbon monoxide, nitrogen, and uncondensable hydrocarbons and water vapor. Although the invention is not dependent upon any particular method for the destructive distillation of acid sludge to produce a sulphur dioxide gas mixture and carbonaceous residue, decomposition of the sludge is preferably effected by externally heating a body of sludge, in a substantially air-tight retort, at relatively low temperatures, for example from 300 to 600° F. On heating, the free and combined sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and nitrogen.

Preferably, decomposition of the sludge is effected at such relatively low temperatures as above noted, and under such conditions that decomposition proceeds only to approximately a point at which substantially all the free and combined sulphuric acid initially contained in the sludge is reduced. In this situation, the solid carbonaceous residues formed usually contain appreciable quantities of volatile hydrocarbons, and in the case of some sludges the volatile matter content of the residue may run in excess of 38-40%. This volatile matter content of the residue is particularly effective as a reducing agent in the subsequent reduction of sulphur dioxide. Accordingly, destructive distillation of the sludge is not preferably carried beyond the condition at which substantially all of the sulphuric acid is broken up. Coke produced by the above method and discharged from the retort 10 through outlet 11 may analyze substantially as follows:

|  | Per cent |
|---|---|
| Total acidity ($H_2SO_4$) | 2.1 |
| Ash | 1.2 |
| Total volatile matter, including $H_2SO_4$ | 32.1 |
| Fixed carbon | 66.7 |

The gases formed in the retort 10 by the decomposition of the sludge and discharged into pipe connection 16 contain generally not substantially in excess of 20% by volume of sulphur dioxide, say 75-80% water vapor, and smaller quantities of hydrocarbon vapors and carbon dioxide. For example, when decomposing a sludge such as mentioned above, the gas mixture in line 16 may contain by volume about 18% sulphur dioxide, about 79.5% water vapor, and smaller amounts of hydrocarbon vapors and carbon dioxide. The retort gas stream of this nature flows through line 16 into the bottom of cooling tower 17, and is contacted therein with a downwardly flowing stream of water introduced into the head of the tower through pipe 18. The gas stream rising through the tower is cooled, and the bulk of the water and condensable hydrocarbon vapors of the retort gas stream is condensed, and runs out of the tower with the cooling liquid into tank 20, in which the water and oily liquids may be separated by decantation or otherwise. The quantity of water run through the tower is regulated by valve 19, so as to cool the gas to about, say, 100° F., at which temperature the gas stream enters the pipe line 21. When so operating, the cooling liquid runs out of the tower 17 at temperatures of about 160° to 180° F., and at this temperature a minimum quantity of sulphur dioxide is absorbed and retained in the cooling liquid. Since the decomposition of the sludge is effected in retort 10 substantially in the absence of air or other diluting gas, the retort gas mixture in pipe 21 after separation of water and condensable hydrocarbons is rich in sulphur dioxide. The gas mixture thus formed usually contains in excess of about 43% and generally from 70 to 90% sulphur dioxide, the balance consisting chiefly of uncondensed water vapor, and gaseous hydrocarbons with smaller amounts of carbon dioxide and carbon monoxide. When working with the particular sludge mentioned, the gas mixture in line 21 may contain, for example, by volume, 85% sulphur dioxide, 5.5% water vapor, 5% gaseous hydrocarbons, 1.2% carbon dioxide, 1.0% carbon monoxide and 2.3% nitrogen originating in the nitrogen containing compounds present in the sludge. The amount of water vapor remaining in the gas will, of course, depend largely on the extent to which the gas is cooled to condense out water. Preferably, the gas is not completely dried, and the cooling in tower 17 should be so controlled as to leave in the gas, say, 4 to 8% water by volume, since the presence of this amount of water vapor appears to prevent formation of COS in the subsequent reduction of the sulphur dioxide to sulphur.

As previously noted, the sulphur dioxide gas thus produced is sufficiently concentrated so that it may economically be reacted with reducing agents to produce elemental sulphur in a self-sustaining reduction reaction, and for this purpose the gas stream in line 21 is conducted into the top of reduction chamber 25.

Reduction of sulphur dioxide may be effected in the reduction chamber 25 by reacting the sulphur dioxide with suitable reducing agents either with or without catalysts. Any suitable reducing agent, as for example carbon, hydrocarbons, or hydrogen, may be utilized to bring about reduction of sulphur dioxide to sulphur. Where desired, the reduction chamber may be packed with bauxite brick which may, at high temperatures, act catalytically to promote the reaction of sulphur dioxide and reducing agents. Where it is advantageous to employ the latter in the form of a gas, a reducing agent, such as methane in proper quantities may be introduced into the reduction chamber through inlet 27.

In accordance with the preferred embodiment of the invention, however, the sulphur dioxide is reduced to elemental sulphur by contacting the sulphur dioxide with solid carbonaceous residue resulting from the decomposition of the acid sludge, and withdrawn from the retort 10 through the outlet 11. This reduction reaction may be effected in reduction chamber 25 either by providing therein beds of solid carbonaceous residue, or by making provision for the continuous passage of solid carbonaceous residue through the reduction chamber.

In the presently described modification of the process of the invention, involving the apparatus of Fig. 1, it will be understood the exit gas of tower 17 has a sulphur dioxide concentration preferably not less than about 43% by volume. The reason for this preferred minimum concentration will be hereinafter explained.

The gas stream in line 21, being at temperatures of about 100° F., is preheated to about 850° F. prior to introduction into the upper end of the reduction chamber. This preheating of the gas stream when the latter contains not less than about 43% sulphur dioxide, may be advantageously effected by withdrawing desired quantities of reaction products of chamber 25, at elevated temperatures, e. g. about 1100° to 1200° F., from outlet 28 by blower 23, and introducing such quantities of hot reaction products into the inlet side of blower 23 through pipe 30. The quantities of hot reaction products thus fed into the incoming sulphur dioxide gas stream may be controlled by adjustment of valve 31 according to the particular operating conditions. Ordinarily, the admixture of about 2 to 4 volumes (standard conditions) of hot reaction products from outlet 28 with about one volume of incoming sulphur dioxide gas in line 22 serves to raise the temperature of the gas mixture in line 24 to about 850° F.

The admixture with the incoming sulphur dioxide gas stream of hot reaction products serves two purposes; first, it heats up the incoming gas stream to reactive temperature, and second, it dilutes the incoming gas to such an extent as to avoid excessive temperature rise in the reduction chamber because of the exothermic reaction effected therein. Under some operating conditions, for example where the exit gas of tower 17 has a sulphur dioxide content appreciably in excess of 43%, the amount of recycled reaction products required to dilute the gas stream sufficiently to avoid excessive temperature rise in the reaction chamber, may be sufficiently in excess of that required to heat the incoming gas stream so as to raise the temperature of the gas stream as it enters the reduction chamber considerably above the desired initial temperature, thus decreasing the permissive temperature rise during the reduction reaction. To avoid this condition, a controlled amount of the products in line 30 may be by-passed through cooler 32 which may be arranged to recover in liquid form any sulphur condensed, so that the gas stream on entering the reduction chamber 25 is heated only to about the desired temperature, i. e. 850° F.

Because of the catalytic properties of the carbonaceous residues produced in the acid sludge decomposition process, the reduction reaction in chamber 25 starts immediately at the relatively low temperature noted, and reduction of sulphur dioxide to sulphur by hydrocarbons proceeds. In the preferred form of the invention, the carbonaceous residues utilized are those containing substantial amounts of volatile hydrocarbons. When operating with this type of residue, the volatile hydrocarbons in the residue are primarily utilized in the reduction of the sulphur dioxide, and it appears that the reduction takes place selectively to a substantial extent, i. e. the sulphur dioxide appears to be reduced first by the volatile hydrocarbons and as the volatile hydrocarbons become exhausted, and fixed carbon is consumed, the temperature necessary to bring about reduction by the non-volatile portion of the residue increases. Hence, in accordance with one modification of the process, the reduction of the sulphur dioxide may be effected substantially entirely by the volatile hydrocarbon content of the residue and when the volatile matter in the residue becomes substantially exhausted, residual coke is removed from the reaction chamber. This mode of operation permits the economical use of the volatile matter in the residue, and at the same time provides for the withdrawal of the residue from the reaction chamber at about the time available volatile matter of the residue is exhausted. The residue when withdrawn from the reaction chamber at this stage may be used as coke or otherwise. If desired, operations may be conducted so that the hydrocarbons and the fixed carbon are consumed, in which case ash only is withdrawn from the reduction chamber.

When operating with a residue which, because of the nature of the sludge from which it was obtained or because of the method of decomposition, contains but little or even no volatile matter available as a reducing agent, the residue is nevertheless an efficient reagent-catalyst for reduction of sulphur dioxide, although a somewhat higher reaction temperature is required than when the residue contains a substantial quantity of volatile matter. For example, when the residue is low in volatile matter, the reaction may be initiated advantageously at a higher temperature, say about 950–1000° F.

The reduction reaction involved is exothermic, and although reduction is initiated at the low temperature of about 900° F., the temperature tends to rise rapidly. At high temperatures, hydrogen sulphide in variable quantities is formed, and accordingly, as it is desired to avoid formation of excessive amounts of hydrogen sulphide in the exit gases of the reaction chamber, the temperature of the reaction is preferably not permitted to exceed about 1200° F. Generally, operations are conducted so the temperature of the products leaving the reaction chamber is about 1150° F. It has also been found that at a temperature of about 1000° F. or higher, sulphur compounds originating in the crude oils subjected to acid treatment and appearing in the acid sludges and in the carbonaceous residues resulting from the destructive distillation of the sludges, are decomposed in the reduction chamber, and the sulphur content of such compounds is recovered, thus increasing the sulphur recovery of the process as a whole.

When operating with the apparatus of Fig. 1, the reason why the sulphur dioxide concentration of the gas in line 21 should be preferably not substantially less than about 43% by volume is as follows. Where the sulphur dioxide gas is produced for example by decomposing acid sludge substantially in the absence of air and hence does not contain substantial quantities of diluting nitrogen, the sulphur dioxide concentration of the gas entering the reduction chamber 25 should be not substantially less than about 13% by volume so that the subsequent reduction reaction will be self-sustaining. Referring to Fig. 1, the raw gas from tower 17 in pipe line 22 is generally at a temperature of about 100° F. and before admitting this gas to the reduction chamber 25 the gas should be preheated to approximately 850° F. Preheating is accomplished by introducing, into the incoming raw gas stream, hot reaction products from the gas line 30. In order to raise the temperature of the incoming gas from 100° F. to approximately 850° F., it is usual under most operating conditions to introduce into about one volume of incoming raw gas about two to four volumes of reduction products from line 30. This admixture of reaction products with raw gas reduces the sulphur dioxide concentration of the latter, and where the initial sulphur dioxide concentration of the raw gas is approximately 43%, the admixture of one volume thereof with about 2.8 volumes of reduction products, would decrease the sulphur dioxide concentration of the resultant gas mixture in line 24, just before entering the reduction chamber 25, to about 13%, the preferably minimum sulphur dioxide concentration at which the reduction reaction is self-sustaining. Accordingly, the sulphur dioxide concentration of the raw gas stream in line 21 should preferably not be appreciably less than 43%, since admixture therewith of sufficient reaction products to preheat the incoming raw gas and control the temperature conditions in the reduction chamber would decrease the sulphur dioxide concentration of the gas entering the reduction chamber to less than about 13%, below which concentration the reduction reaction would not be self-sustaining when employing a gas of the nature described in connection with the apparatus of Fig. 1.

The exit gases and vapors of the reduction chamber in outlet 28 contain sulphur generally as vapor, a relatively large amount of water vapor, appreciable amounts of carbon dioxide, and smaller quantities of sulphur dioxide, hydrogen sulphide, carbon monoxide and possibly some hydrocarbons. For example, when operating with a gas approximately of the composition mentioned above, the exit gases may contain by volume about 23% sulphur, 2.3% $SO_2$, 6.0% $H_2S$, 48.8% $CO_2$, 1.5% CO, 11.8% $H_2O$, 4.3% hydrocarbons, and 2.3% $N_2$.

That portion of the products of the reduction chamber not recycled by blower 23 flows through line 29 into the cooler or collector 36. As noted, the latter may be a waste heat boiler, and so operated as to cool the gas stream during passage therethrough to about 300° F., the sulphur condensed in the collector being withdrawn from the collector through outlet 38.

The gas stream leaving cooler 36 through line 40 may in several instances contain appreciable quantities of sulphur dioxide and hydrogen sulphide. Operations should preferably be conducted so that the gases in line 40 contain a slight excess of hydrogen sulphide. In this case, necessary quantities of sulphur dioxide may be by-passed through valve 44 and pipe 43 into connection 40 to provide therein a gas mixture containing approximately reacting proportions of hydrogen sulphide and sulphur dioxide. This gas mixture is then introduced at temperatures generally, of about 300° F. into chamber 41, and sulphur dioxide and hydrogen sulphide are reacted therein in the presence of a catalyst, preferably activated bauxite, to produce sulphur in accordance with the equation—

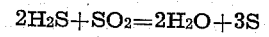

$$2H_2S + SO_2 = 2H_2O + 3S$$

Other catalysts such as iron oxide and pyrites cinders may be advantageously employed.

Preferably the reaction taking place in chamber 41 should be so regulated as to avoid a temperature rise in the gas stream of more than about 300° F. Should conditions be such that the temperature of the reaction tends to rise to a greater extent, provision may be made for controlling the reaction temperature by circulating through the chamber 41 suitable amounts of tail gases from stack 53. As will be observed, the reaction in chamber 41 is conducted so that sulphur formed therein is in molten condition and runs out of the chamber through connection 46. The exit gases of the catalyst chamber 41 flow through line 50 into an absorber 51, and are contacted with absorbing materials, such as activated carbon, silica gel or tarry oils, to remove the last traces of sulphur and sulphur compounds from the gas stream before the latter is discharged into the atmosphere from stack 53.

Referring to Fig. 2, cooling tower 17, reduction chamber 25 and catalyst chamber 41 are constructed and arranged as in the apparatus of Fig. 1. Reference numeral 55 indicates a heat exchanger which may generally be similar to the waste heat boiler 36 of Fig. 1. In Fig. 2, the raw gas leaving tower 17 flows through line 56 into the lower end of heat exchanger 55, through the latter, and thence through line 57 into the top of reduction chamber 25. The major portion of the products of reduction chamber 25 pass through conduit 58 to the top of the heat exchanger 55, and are discharged from the bottom through pipe 60, which feeds the cooled products into the catalyst chamber 41. Sulphur condensed in heat exchanger 55 is withdrawn therefrom through outlet 61.

The apparatus of Fig. 2 is preferably employed where because of the method of decomposing the acid sludge or because of the nature of the sludge itself, the exit gas of tower 17 has a sulphur dioxide concentration appreciably less than about 43% but not less than about 9% by volume. Where this condition prevails, for example in cases where the sludge is decomposed by heating in direct contact with hot gases to produce sulphur dioxide gas containing substantial amounts of diluting nitrogen, the gas in line 56 is preheated to about 850° F. by heat exchange rather than by admixture with hot reaction products, thus avoiding dilution of the raw gas stream such as takes place in operation of the process when carried out in apparatus of Fig. 1. In Fig. 2, the raw sulphur dioxide gas from tower 17 is preheated to reactive temperature in heat exchanger 55 by passing the incoming raw gas in heat exchange relation with the hot reduction products discharged from reduction chamber 25. The raw gas from line 56 enters the bottom of the heat exchanger 55 at temperatures of about 100° F., and the reaction products from reduction chamber 25 are fed into the top of the heat exchanger at approximately 1100-1200° F. Operations may generally be so conducted that the temperature of the raw gas discharged from the heat exchanger into reduction chamber 25 is about 850° F., and the temperature of the reduction products in line 60, after having passed through the heat exchanger, is about 300° F.

In this manner, the heat of the reaction products is utilized to preheat the incoming raw gas stream to reactive temperature without diluting the latter. The sulphur condensed in heat exchanger 55, by the cooling of the reduction products, runs out through line 61. The incoming gas is fed into the reduction chamber 25, and the reduction reaction in chamber 25 takes place as already explained in the operation of the process when carried out in the apparatus of Fig. 1.

In some instances, it may be desirable to raise the temperature of the raw gas entering the heat exchanger through line 56 to, say, about 200° F. to avoid undue corrosion in the heat exchanger. For this purpose, a controlled amount of hot gas from line 57 may be withdrawn by a recycling blower 62, and fed through pipe 63 into line 56 just ahead of the heat exchanger.

When working with a raw gas having a low sulphur dioxide concentration at point of entering reduction chamber 25, say not more than about 20%, temperature control in the reduction chamber will probably be unnecessary. However, if the gas being utilized has a sulphur dioxide concentration greater than about 20%, it may be desirable to provide means for avoiding temperatures in the reduction chamber higher than about 1150-1200° F. This may be done by externally cooling the reduction chamber, or alternatively by recycling inert gases and/or vapors through the reduction chamber. In the latter case, by suitable regulation of valves 69 and 70, a desired amount of hot reaction products is withdrawn by blower 68 and passed through cooler 71 which may be similar to cooler 32 of Fig. 1. Exit gases of cooler 71, at temperatures of about 300° F., then pass through pipe 66 into reduction chamber 25, sulfur condensed in cooler 71 being recovered as liquid at outlet 72, and any excess gas being by-passed through pipe 73 into pipe 60.

In the operation of the process as carried out in connection with apparatus of Fig. 1, it has been noted the sulphur dioxide concentration of the gas stream entering the reduction chamber should be preferably not less than about 13% by volume, and not less than about 9% by volume in that modification of the process carried out in the apparatus of Fig. 2. The reason for this difference is as follows. In Fig. 1, the sludge is decomposed in the absence of air and the gas mixture in line 21 is high in sulphur dioxide, e. g. 85% by volume. This gas is diluted in line 24 with recycled reduction products comprising largely sulphur vapor and carbon dioxide, relatively heavy gases. In the apparatus of Fig. 2, the sludges may be decomposed by direct contact with hot combustion gases in which case the diluent of the gas in line 57 is largely nitrogen (originating in the air employed as the combustion gas) a relatively light gas. Heat generated is based on the weight of reactant which in both Fig. 1 and 2 is the sulphur dioxide that is reduced to sulphur. Heat absorbed is based on weight and specific heat of the mass absorbing heat. Hence, in Fig. 1, the sulphur vapor and carbon dioxide of the recycled products being relatively heavy absorb more heat than the relatively light nitrogen diluent of the reduction chamber inlet gas of Fig. 2, and in Fig. 1 a greater amount of heat generating reactant (sulphur dioxide) is needed than in Fig. 2. The investigations upon which the invention is based indicate that in methods such as described in connection with Fig. 1, the sulphur dioxide concentration of the gas entering the reduction chamber should preferably be not less than about 13% by volume, and in Fig. 2, preferably not less than about 9% by volume.

As indicated hereinbefore the sulphur dioxide gas utilized in accordance with this invention is prepared to contain substantially no free oxygen, i. e. no more than one or two percent of free oxygen and preferably less than one-half percent oxygen.

I claim:

1. The method of producing elemental sulphur which comprises decomposing acid sludge, derived from sulphuric acid treatment of petroleum oils, by heating substantially in the absence of gases, other than those formed by decomposition of the sludge, to form a raw hot gas mixture containing sulphur dioxide and condensable vapors, cooling the gas mixture to temperature low enough to condense and remove from the gas mixture the bulk of the condensable vapors, controlling said sludge decomposition and said raw sulphur dioxide gas cooling operations so as to produce a cool gas mixture having a sulphur dioxide concentration not substantially less than about 43%, reacting in a reduction zone, in the absence of extraneous heat and at temperatures not substantially less than about 850° F. and not substantially above that at which more than small quantities of hydrogen sulphide are formed, the sulphur dioxide with reducing material to produce elemental sulphur, introducing at least a substantial portion of the hot reaction products from the reduction zone into the reduction zone incoming sulphur dioxide, controlling the quantity of said hot reaction products introduced into said incoming sulphur dioxide gas so as to heat the incoming sulphur dioxide gas mixture to not less than about 850° F., to maintain the temperature in the reaction zone not substantially above that at which more than small quantities of hydrogen sulfide are formed, and to prevent reduction of the sulphur dioxide concentration of the gas mixture entering the reduction zone below about 13%, and collecting elemental sulphur.

2. The method of producing elemental sulphur which comprises decomposing acid sludge, derived from sulphuric acid treatment of petroleum oils, by heating substantially in the absence of gases, other than those formed by decomposition of the sludge, to form solid carbonaceous material and a raw hot gas mixture containing sulphur dioxide and condensable vapors, cooling the gas mixture to temperature low enough to condense and remove from the gas mixture the bulk of the condensable vapors, controlling said sludge decomposition and said raw sulphur dioxide gas cooling operations so as to produce solid carbonaceous material containing substantial amounts of volatile matter and to produce a cool gas mixture having a sulphur dioxide concentration not substantially less than about 43%, reacting in a reduction zone in the absence of extraneous heat and at temperatures not substantially less than about 850° F. and not substantially above 1200° F., the sulphur dioxide with said solid carbonaceous material to produce elemental sulphur, introducing at least a substantial portion of the hot reaction products from the reduction zone into the reduction zone incoming sulfur dioxide, controlling the quantity of said hot reaction products introduced into said incoming sulphur dioxide gas so as to heat the incoming sulphur dioxide gas mixture to not less than about 850° F., to maintain the temperature in the reaction zone not substantially above 1200° F., and to prevent reduction of the sulphur dioxide concentration of the gas mixture entering the reduction zone below about 13%, and collecting elemental sulphur.

3. The method of producing elemental sulphur which comprises decomposing acid sludge, derived from sulphuric acid treatment of petroleum oils, by heating to form a raw hot gas mixture containing sulphur dioxide and condensable vapors, separating the sulphur dioxide from at least the bulk of said condensable vapors by a separating operation involving cooling the raw gas mixture, controlling said sludge decomposition and said separating operations so as to produce a relatively cool gas mixture having a sulphur dioxide concentration not substantially less than about 43%, reacting in a reduction zone, in the absence of extraneous heat and at temperatures not substantially less than about 850° F. and not substantially above that at which more than small quantities of hydrogen sulphide are formed, the sulphur dioxide with reducing material to produce elemental sulphur, introducing at least a substantial portion of the hot reaction products from the reduction zone into the reduction zone incoming sulphur dioxide, controlling the quantity of said hot reaction products introduced into said incoming sulphur dioxide gas so as to heat the incoming sulphur dioxide gas mixture to not less than about 850° F., to maintain the temperature in the reaction zone not substantially above that at which more than small quantities of hydrogen sulphide are formed, and to prevent reduction of the sulphur dioxide concentration of the gas mixture entering the reduction zone below about 13%, and collecting elemental sulphur.

4. The method of producing elemental sulphur which comprises decomposing acid sludge, derived from sulphuric acid treatment of petroleum oils, by heating to form solid carbonaceous residue and a raw hot gas mixture containing sulphur dioxide and condensable vapors, separating the sulphur dioxide from at least the bulk of said condensable vapors by a separating operation involving cooling the raw gas mixture, controlling said sludge decomposition and said separating operations so as to produce a relatively cool gas mixture having a sulphur dioxide concentration not substantially less than about 43%, reacting in a reduction zone, in the absence of extraneous heat and at temperatures not substantially less than about 850° F. and not substantially above that at which more than small quantities of hydrogen sulphide are formed, the sulphur dioxide with reducing material comprising said carbonaceous residue to produce elemental sulphur, introducing at least a substantial portion of the hot reaction products from the reduction zone into the reduction zone incoming sulphur dioxide, controlling the quantity of said hot reaction products introduced into said incoming sulphur dioxide gas so as to heat the incoming sulphur dioxide gas mixture to not less than about 850° F., to maintain the temperature in the reaction zone not substantially above that at which more than small quantities of hydrogen sulphide are formed, and to prevent reduction of the sulphur dioxide concentration of the gas mixture entering the reduction zone below about 13%, and collecting elemental sulphur.

BERNARD M. CARTER.